United States Patent
Bingham

[19]
[11] Patent Number: 6,035,000
[45] Date of Patent: Mar. 7, 2000

[54] MITIGATING RADIO FREQUENCY INTERFERENCE IN MULTI-CARRIER TRANSMISSION SYSTEMS

[75] Inventor: John A. C. Bingham, Palo Alto, Calif.

[73] Assignee: Amati Communications Corporation, San Jose, Calif.

[21] Appl. No.: 08/834,500

[22] Filed: Apr. 4, 1997

Related U.S. Application Data

[60] Provisional application No. 60/016,252, Apr. 19, 1996.

[51] Int. Cl.[7] .............................. H04L 25/03; H04L 25/49
[52] U.S. Cl. ........................ 375/296; 375/346; 455/296; 370/525
[58] Field of Search ..................................... 375/295, 296, 375/346, 222, 260; 455/296; 370/286, 202, 526, 525, 528

[56] References Cited

U.S. PATENT DOCUMENTS 4,269,482  5/1981  Mori .
5,887,032  3/1999  Cioffi ...................................... 375/257

FOREIGN PATENT DOCUMENTS

WO91/15925  10/1991  WIPO .
WO92/17010  10/1992  WIPO .

OTHER PUBLICATIONS

Jacobsen, Cioffi: "High–performance multimedia transmission on the cable television network" Supercomm/ICC, May 1–5, 1994, New York, Us, pp. 1048–1052.

Wu, Caron: "Digital television terrestrial broadcasting" IEEE Communications Magazine, vol. 32, No. 5, May 1994, pp. 46–52.

*Primary Examiner*—Temesghen Ghebretinsae
*Attorney, Agent, or Firm*—Beyer & Weaver, LLP

[57] ABSTRACT

Methods and mechanisms for reducing the impact of radio frequency interference in multi-carrier data transmission systems are disclosed. In one aspect of the invention, dummy tones are used to suppress emissions within restricted frequency bands. In another aspect of the invention, signals received on designated quiet tones are detected and used to facilitate canceling of RF interference on adjacent active tones.

23 Claims, 8 Drawing Sheets

MITIGATING RADIO FREQUENCY INTERFERENCE IN MULTI-CARRIER TRANSMISSION SYSTEMS

This application claims priority of provisional application Ser. No. 60/016,252, filed Apr. 19, 1996 which is incorporated herein by reference.

BACKGROUND OF THE INVENTION

The present invention relates generally to very high speed discrete multi-carrier data transmission systems. More particularly, a mechanism for reducing the impact of radio frequency (RF) interference in multi-carrier transmission schemes is disclosed.

The Alliance For Telecommunications Industry Solutions (ATIS), which is a group accredited by the ANSI (American National Standard Institute) Standard Group, has recently finalized a discrete multi-tone based standard for the transmission of digital data over Asymmetric Digital Subscriber Lines (ADSL). The standard is intended primarily for transmitting video data over ordinary telephone lines, although it may be used in a variety of other applications as well. The North American Standard is referred to as the ANSI T1.413 ADSL Standard and is incorporated herein by reference. Transmission rates under the ADSL standard are intended to facilitate the transmission of information at rates of at least 6 million bits per second (i.e., 6+ Mbit/s) over twisted-pair phone lines. The standardized system defines the use of a discrete multi tone (DMT) system that uses 256 "tones" or "sub-channels" or that are each 4.3125 kHz wide in the forward (downstream) direction. In the context of a phone system, the downstream direction is defined as transmissions from the central office (typically owned by the telephone company) to a remote location that may be an end-user (i.e., a residence or business user). In other systems, the number of tones used may be widely varied. However when modulation is performed efficiently using an Inverse Fast Fourier Transform (IFFT), typical values for the number of available sub-channels (tones) are integer powers of two, as for example, 128, 256, 512, 1024 or 2048 sub-channels.

The Asymmetric Digital Subscriber Lines standard also defines the use of a reverse signal at a data rate in the range of 16 to 800 Kbit/s. The reverse signal corresponds to transmission in an upstream direction, as for example, from the remote location to the central office. Thus, the term Asymmetric Digital Subscriber Line comes from the fact that the data transmission rate is substantially higher in the downstream direction than in the upstream direction. This is particularly useful in systems that are intended to transmit video programming or other video signals to a remote location over the telephone lines. By way of example, one potential use for such systems allows residential customers to obtain video information such as movies over the telephone lines or cable rather than having to rent video cassettes. Another potential use is in video conferencing.

At the time of this writing, ATIS has begun work on the next generation subscriber line based transmission system, which is referred to as the VDSL (Very High-Speed Digital Subscriber Line) standard. The VDSL standard is intended to facilitate transmission rates of at least 12.98 Mbit/s and preferably 25.96 or 51.92 Mbit/s in the downstream direction. Simultaneously, the Digital, Audio and Video Council (DAVIC) is working on a short range system, which is referred to as Fiber To The Curb (FTTC). The transmission medium to the customer premise of both these systems is standard unshielded twisted pair (UTP) telephone lines.

A number of multi-carrier modulation schemes have been proposed for use in the VDSL and FTTC standards (hereinafter VDSL/FTTC). One proposed multi-carrier solution utilizes discrete multi-tone (DMT) signals in a system that is similar in nature to the ADSL standard. Other proposed modulation schemes include carrierless amplitude and phase modulated (CAP) signals; discrete wavelet multi-tone modulation (DWMT); and OFDM which is a simplified version of DMT. In order to achieve the data rates required by VDSL/FTTC, the transmission bandwidth must be significantly broader than the bandwidth contemplated by the ADSL. By way of example, the discrete multi-tone system adopted for ADSL applications utilizes a transmission bandwidth on the order of 1.1 MHz, while bandwidths on the order of 10 MHz are being contemplated for VDSL/FTTC applications. In one proposed DMT system for VDSL/FTTC applications, the use of 256 "tones" or "sub-channels" that are each 43.125 kHz wide is contemplated.

The use of these wide band multi-carrier modulation approaches have some inherent obstacles that must be overcome. One particular problem relates to radio frequency interference. As is well known to those skilled in the art, amateur radio operators utilize several relatively narrow frequency bands in the 1 MHz to 12 MHz frequency range. By way of example, the following approximate frequency bands are reserved for amateur radio operators use: 1.8 to 2.0 MHz; 3.5 to 4.0 MHz; 7.0 to 7.3 MHz and 10.1 to 10.15 MHz. Thus, it is important that any subscriber line based modulation scheme not output significant interference in those frequency bands and, of course, the system must be arranged to handle particularly high levels of interference in those frequency ranges. The present invention provides a mechanism for handling such matters.

SUMMARY OF THE INVENTION

The present inventions relate to methods and mechanisms for reducing the impact of radio frequency interference in multi-carrier data transmission systems. In one aspect of the invention, dummy tones are used to suppress emissions within restricted frequency bands. In another aspect of the invention, signals received on designated quiet tones are detected and used to facilitate canceling of RF interference on adjacent active tones.

In a first aspect of the invention related to controlling RF emissions within a restricted frequency band, a dummy tone is transmitted over a selected dummy subchannel. The magnitude and phase of the dummy tone is chosen to suppress the transmission power within the restricted frequency band due to sidelobe transmissions from at least one of the data subchannels outside of the restricted frequency band.

In some embodiments, a pair of dummy tones are transmitted over distinct dummy subchannels located on opposite sides of the restricted frequency band. The actual location of the dummy subchannel(s) may vary in accordance with the needs of a particular system. By way of example, the dummy subchannel may be a subchannel located immediately adjacent the restricted frequency band. In another example, the dummy subchannel may be a subchannel located two tones away from the restricted frequency, with the immediately adjacent subchannel being a designated quiet tone. In transmission systems that have multiple restricted frequency bands, separate dummy subchannel may be associated with each of the restricted frequency bands.

In a second aspect of the invention related to handling RF interference received by the modem, at least one of the subchannels near a frequency where RF interference is expected is designated a quiet tone which does not transmit any signal. However, the noise received on the quiet subchannel is detected and used to effectively estimate the RF interference that will likely be present on selected adjacent active tones. The detected noise is thus used to facilitate the canceling of RF interference imposed on the data signals received the adjacent active tones.

In some embodiments, a pair of quiet tones are provided with one quiet tone being provided on each side of a designated restricted frequency band. In some embodiments the designated quiet tones are in the subchannels immediately adjacent the designated restricted frequency band. In others, one or both of the designated quiet tones are within the restricted frequency band.

The dummy tones and quiet tones can be used in combination is systems where both ingress and egress of RF interference are of concern. In such systems, the dummy tones will typically be positioned outside of the quiet tones. The described arrangements work particularly well in discrete multi-tone transmission systems.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE DRAWINGS

Figure 1:
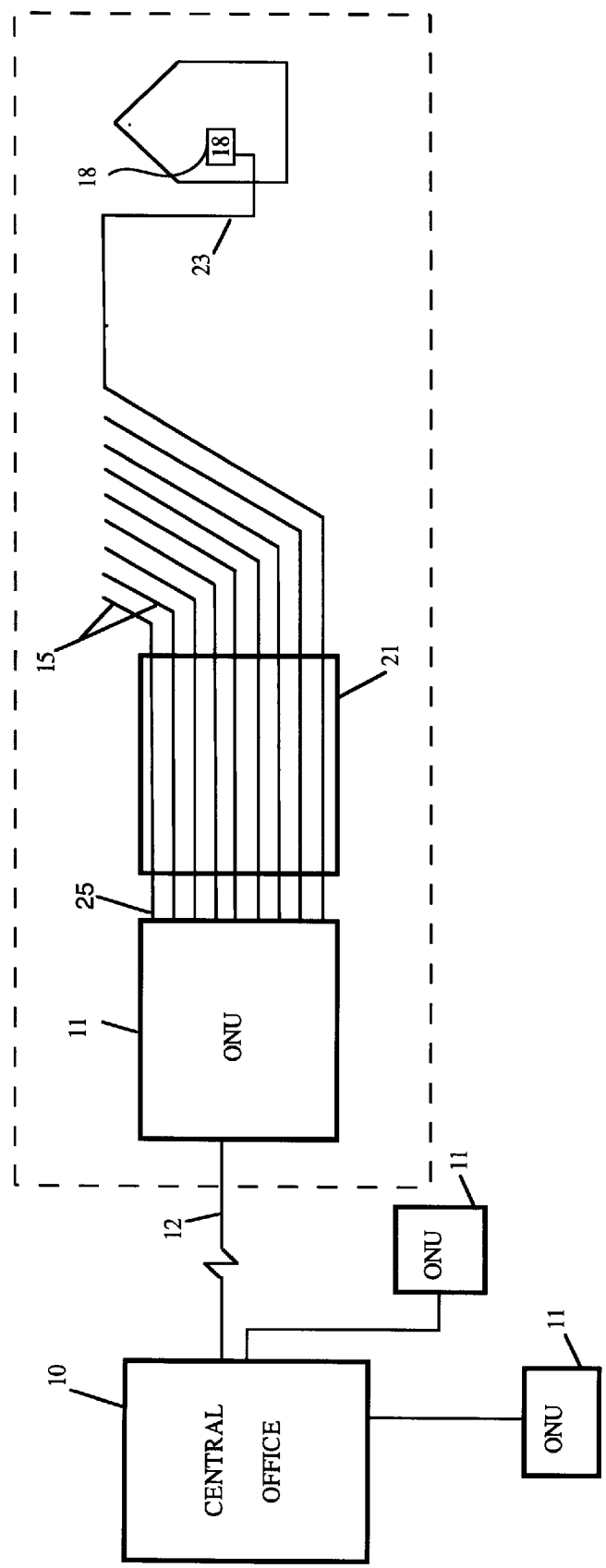
FIG. 1 is a block diagram of a subscriber line based communication system having a plurality of twisted pair phone lines that extend from an optical network unit to respective remote units.

Referring initially to FIG. 1, the relevant portions of a typical wired telecommunications network that is suitable for VDSL/FTTC applications will be briefly described. The system includes a central office 10 that services a plurality of distribution posts 11 which may take the form of a optical network units (ONU). Each distribution post communicates with the central office 10 over one or more high speed, multiplexed transmission line 12 that may take the form of a fiber optic line. The optical network unit 11 typically serves a multiplicity of discrete subscriber lines 15. Each subscriber line 15 typically services a single end user that is located within 1.5 kilometers of the ONU. The end user would have a remote unit 18 suitable for communicating with the ONU at very high data rates. The remote units includes a modem but may take the form of a variety of different devices, as for example, a telephone, a television, a monitor, a computer, a conferencing unit, etc. Of course, it is possible that the end user may have a plurality of phones or other remote units 18 wired to a single line. The subscriber lines 15 serviced by a single ONU 11 typically leave the ONU in a shielded binder 21. The shielding in the binder generally serves as a good insulator against the emission (egress) and reception (ingress) of RF noise. However, the last segment of this subscriber line, commonly referred to as a "drop" 23 branches off from the binder and is coupled directly or indirectly to the end user's remote units. This "drop" 23 portion of the subscriber line 15 between the remote unit 18 and the binder 21 is typically unshielded. In most applications the length of the drop is not more than about 30 meters. However, the unshielded wire effectively acts as an antenna that both emits and receives RF signals. Additionally, there is some concern that the connection 25 between the ONU 11 and the twisted pair subscriber lines 15 may also serve both as an RF energy emission source and as the receptor of RF energy.

Figure 2:
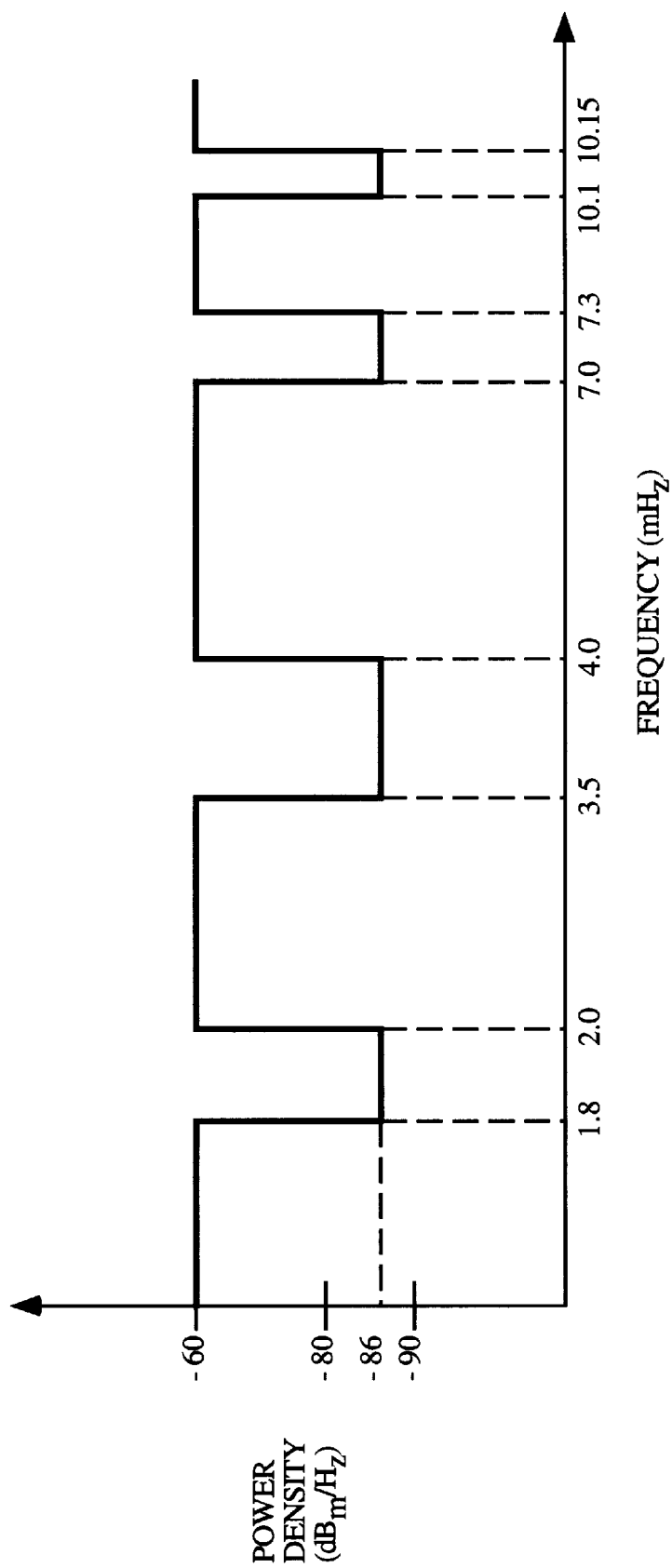
FIG. 2 is a power spectral density graph illustrating the magnitude of the permissible transmission power from a remote unit over exposed twisted pair wires as a function of transmission frequency in the 0 to 12 MHz frequency range.

The amount of energy that a particular communication system may transmit is regulated by both governmental and practical considerations. As indicated above, in discrete multi-tone systems suitable for use in the VDSL/FTTC applications, frequency bands on the order 12 MHz are being contemplated. Within that 12 MHz frequency range, there are several narrow bands that are allocated to amateur radio users. Thus, one proposed transmission power spectral density for VDSL/FTTC upstream communications is illustrated in FIG. 2. In this embodiment the transmit power mask 32 permits a maximum of −60 dBm/Hz throughout the majority of the frequency band. However, in selected frequency bands where amateur radio RF interference is expected (i.e. 1.8 to 2.0 MHz, 3.5 to 4.0 MHz, 7.0 to 7.3 MHz, and 10.1 to 10.15 MHz) transmissions are limited to significantly lower levels. The permissible output power level in these restricted frequency bands 34 varies somewhat between proposals. However, most parties to the VDSL/ FTTC standardization process have proposed maximum power densities in the range of approximately −80 dBm/Hz to −90 dBm/Hz. One specific suggestion has been −86 dBm/Hz, which would provide a system robust enough to prevent significant interference with a radio located within 50 feet of the emissions source (which would typically be either the drop 23 or the ONU/subscriber line connection 25). Regardless of the actual transmission power that is eventually agreed upon, it is clear that a conscious effort needs to be made to minimize emissions in the prohibited ranges.

Figure 3A:
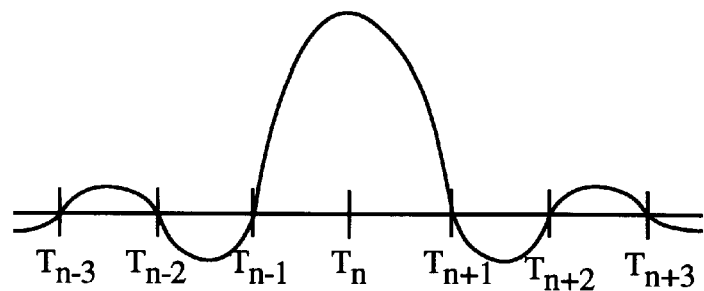
FIGS. 3(a) and 3(b) are diagrammatic graphs illustrating the magnitude of the voltage of a typical single tone in a typical discrete multi-tone transmission system as a function of frequency.
Figure 3B:
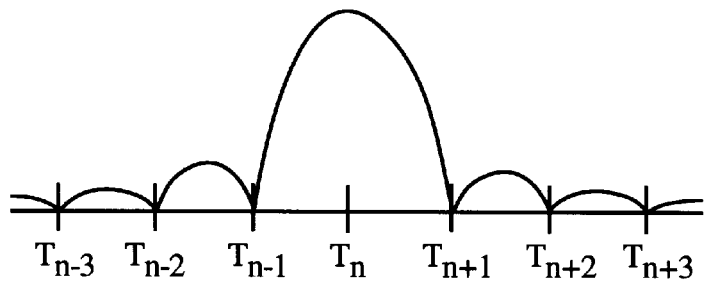

In multi-carrier transmissions schemes such as DMT, there will naturally be a number of subcarriers (tones) that fall within the restricted frequency ranges. Accordingly, a first step in reducing transmissions in the restricted frequency ranges is to turn off those particular subcarriers. This has the advantage of both reducing the emissions in the prohibited frequency range as well as reducing the adverse impacts associated with ingress (receipt) of the radio signals. However, as will be appreciated by those skilled in the art, it is difficult to contain the amount of power emitted for a particular tone tightly around a desired frequency center ($f_c$). Referring next to FIG. 3(a), emissions associated with a particular tone typically include as relatively high power emission centered about the frequency center ($f_c$) 48 and a number of side lobes of decreasing intensity extending on either side thereon. FIG. 3(b) illustrates the magnitude of the absolute value of the intensity of a particular tone having a bandwidth of 43.125 kHz and its sidelobes. The location of the sidelobe power peaks are well defined. The first sidelobe peak is approximately midway between the first and second tones adjacent to the central tone and its peak power is $(2/3\pi)^2$ times (i.e., about 4.5% of) the magnitude of the power at the frequency center. The second sidelobe peak is approximately midway between the second and third tones adjacent the central tone and its peak power is $(2/5\pi)^2$ times (i.e., about 1.6% of) the magnitude of the power at the frequency center. The third sidelobe peak is approximately midway between the third and fourth tones adjacent the central tone and its peak power is $(2/7\pi)^2$ times (i.e., about 0.8% of) the magnitude of the power at the frequency center and so on.

The magnitude and phase of the sidelobe power can make it difficult to limit the power spectral density in a narrow range within the DMT transmission band by simply turning off the tones within the restricted frequency band. By way of example, consider a system which uses tones that are 43.125 kHz wide If an attempt is made to form a 200 kHz wide notch in the 1.8 to 2.0 MHz range by simply turning off the tones within the 200 kHz wide prohibited range (e.g. tones 42 through 46 in a system that has a transmission band of 0 to 11.04 MHz) the emission power at the center of the prohibited range would only be reduced from −60 dBm/Hz to on the order of −73 dBm/Hz. Obviously, this would result in emissions far above the desired range of −80 or −90 dBm/Hz even in the center of the prohibited frequency range. Of course, the emission power at frequencies closer to the boundaries of the prohibited frequency range would be significantly higher. Thus, if an attempt is made to reduce the emissions simply by turning off a range of tones in the multi-carrier transmissions system, the number of tones that need to be turned off would be significantly higher than the number of tones associated with a prohibited frequency range.

By way of example, in a discrete multi-tone system as suggested above, it would likely be necessary to turn off all of the subchannels within a range of 1.6 to 2.2 MHz in order to obtain the desired reduced emissions in the 1.8 to 2.0 MHz prohibited frequency range. Although the discrete multi-tone system is very flexible in its ability to pick and choose the subcarrier frequencies, the requirement of turning off such large frequency bands to avoid amateur radio interference is undesirable and may reduce system performance.

Figure 4:
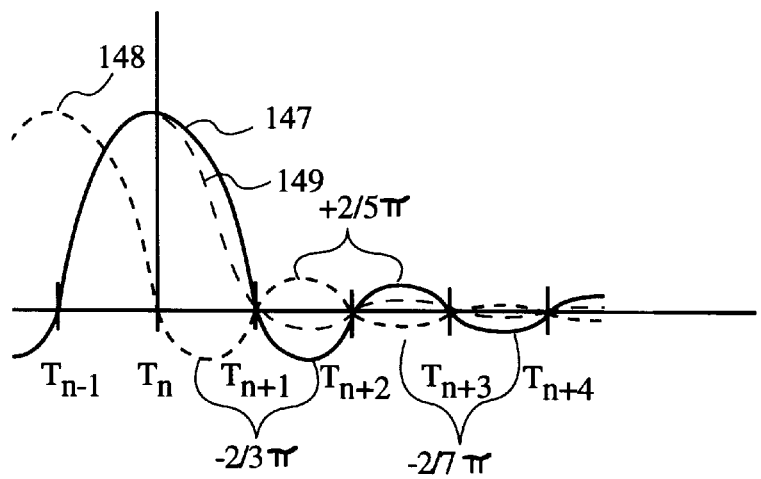
FIG. 4 is a diagrammatic graph illustrating the magnitude of the voltages of a couple of immediately adjacent tones having the same magnitude and illustrating the offsetting of inter-tone voltage that occurs due to interference of their respective sidelobes.

Referring next to FIG. 4, the "interfering" effect that the sidelobes of immediately adjacent tones will be described. As seen therein, tone ($T_n$), has a given voltage level at the center frequency of the associated subchannel. The voltage of the $T_n$ signal 147 drops to zero at the immediately adjacent tones (i.e. at tones ($T_{n-1}$) and ($T_{n+1}$)). For the ease of discussion, FIG. 4 only shows the sidelobes on one side of tone (n). However, it should be appreciated that the relationships described are symmetric. The voltage of the first sidelobe reaches its peak midway between the first and second adjacent tones (i.e. between tones ($T_{n+1}$) and ($T_{n+2}$). The peak voltage is a factor of ($-2/3\pi$) times the voltage of tone ($T_n$). The sidelobe voltage passes through zero again at tones ($T_{n+2}$), ($T_{n+3}$), etc. and reaches intermediate peak midway between the tones. The magnitude of the second sidelobe voltage peak is a factor of ($2/5\pi$) times the voltage of tone ($T_n$). The magnitude of the third sidelobe voltage peak is a factor of ($2/7\pi$) times the voltage of tone ($T_n$) and so on.

If we consider a situation in which tone ($T_{n-1}$) has the same magnitude and phase as tone ($T_n$), then the sidelobes from tone ($T_{n-1}$) 148 essentially mirror the sidelobes of ($T_n$) 147, with the only difference being that they are shifted one tone to the left (as seen in FIG. 4). The combined voltage of the $T_n$ and $T_{n-1}$ signals at any particular frequency is the sum of their individual voltages. One important observation is that the voltage of both the $T_n$ and $T_{n-1}$ signals 147, 148 are zero at the frequency of any adjacent tones. Additionally, the sidelobes are effectively out of phase. That is, the sidelobe voltage of tone $T_n$ reaches its local positive maximums at the same frequencies that the sidelobe voltage of tone $T_{n-1}$ reaches its local negative maximums and vice versa. Thus, the sidelobes tend to at least partially offset one another as illustrated by line 149 in FIG. 4 which illustrates the linear sum of the voltages of the $T_n$ and $T_{n-1}$ signals. In the example given, it was assumed that the magnitude and phase of tones $T_n$ and $T_{n-1}$ were the same. Naturally, if the magnitudes of the tones are different, the magnitude of the sidelobe voltages would change.

When the effects of additional tones are considered, at any given frequency, the combined effect of a plurality of tones is effectively the sum of their respective voltages at the selected frequency. Thus, if we want to control the magnitude and phase of the power generated by the various sidelobes at a particular frequency, that can often be done by choosing an appropriate voltage for one or more of the tones. In one aspect of the invention, one or more dummy tones are used to suppress the power of the emissions in a restricted frequency band.

To appreciate the benefits of using a dummy tone, consider the system described above which has a restricted frequency band within its transmission range (e.g. tones 42–46). Consider the effect of the sidelobes of a plurality of adjacent lower frequency tones at a particular mid-tone frequency of interest ($f_x$) that is half way between the lower most tone ($T_n$) within the restricted frequency band and tone $T_{n+1}$ (e.g. between tones 42 and 43). The sidelobe interference at frequency ($f_x$) due to the lower frequency tones would be the sum of the sidelobes of the lower frequency tones as they appear at frequency ($f_x$). A first order estimate of their effect may be on the order of:

$$\text{Interference} = \beta_1 T_{n-1} + \beta_2 T_{n-2} + \beta_3 T_{n-3} + \beta_4 T_{n-4} + \beta_5 T_{n-5} + \beta_6 T_{n-6} \quad (1)$$

where $\beta_1$ is an appropriate multiplier indicative of the sidelobe voltage from tone $T_{n-1}$ at frequency $f_x$ relative to the voltage of tone $T_{n-1}$ itself; $\beta_2$ is an appropriate multiplier indicative of the sidelobe voltage from tone $T_{n-1}$ at frequency $f_x$ relative to the voltage of tone $T_{n-2}$ itself, and so on. Thus, the effects of the sidelobes from lower frequency tones at frequency $f_x$ can be effectively canceled by applying a dummy tone at tone $T_{n-1}$ that would have a sidelobe magnitude at frequency $f_x$ that is equivalent to the negative of the weighted sum of the previous tones. That is, if:

$$\beta_1 T_{n-1} = \beta_2 T_{n-2} + \beta_3 T_{n-3} + \beta_4 T_{n-4} + \beta_5 T_{n-5} + \beta_6 T_{n-6} + \beta_7 T_{n-7} \quad (2)$$

or $$T_{n-1} = \alpha_2 T_{n-2} + \alpha_3 T_{n-3} + \alpha_4 T_{n-4} + \alpha_5 T_{n-5} + \alpha_6 T_{n-6} + \alpha_7 T_{n-7} \quad (3)$$

where $\alpha_2 = \beta_2/\beta_1$; $\alpha_3 = \beta_3/\beta_1$; $\alpha_4 = \beta_4/\beta_1$; etc., then the combined output voltage at frequency $f_x$ due to the sidelobes would be zero. Thus, it should be apparent that a dummy tone can be used to significantly reduce the magnitude of the effects of sidelobe interference. Using the factors set forth above for the side lobes relative to the main tone, (i.e. $-2/3\pi$, $+2/5\pi$, $-2/7\pi$, etc.) this would result in the following values for the $\alpha$-multipliers:

$\alpha_2 = 3/5 = -0.60$
$\alpha_3 = 3/7 = 0.43$
$\alpha_4 = 3/9 = -0.33$
$\alpha_5 = 3/11 = 0.27$
$\alpha_6 = 3/13 = -0.23$
$\alpha_7 = 3/15 = 0.20$
$\alpha_8 = 3/17 = -0.18$
$\alpha_9 = 3/19 = 0.16$
$\alpha_{10} = 3/21 = -0.14$
$\alpha_{11} = 3/23 = 0.13$ As a practical matter there is generally no need to do a weighted sum of all of the previous tones since the effects of tones that are a great distance away from the restricted frequency range will have a negligible effect on the magnitude and phase of the dummy tone. However, as discussed above, the sidelobes tend to be symmetrical about the center frequency of tone. Therefore, it is generally important to consider the effects of tones present on both sides of the frequency of interest. By way of example, it may be appropriate to use in the range of approximately 5 to 20 tones on each side, or more preferably in the range of approximately 10 to 15 tones on each side. In one specific embodiment, the 10 closest adjacent tones on each side of the restricted frequency band are used.

Although the described example works well to reduce the RF interference emissions in the restricted frequency band, there are several more considerations that may be factored into the calculations of the multipliers. To begin with, the complete canceling of the power of the sidelobe interference at a location that is midway between the first and second tones within the restricted frequency band (e.g. between tones $T_n$ and $T_{n+1}$) would not result in the complete canceling of the sidelobe interference throughout the entire restricted frequency band. This is because the side lobes do not decay proportionally. Thus, it may be desirable to select the values for the $\alpha$-multipliers as number that would better reduce the total power of the interference within the restricted frequency range. Any of a variety of known power minimizing techniques may be used in such calculations. By way of example, one suitable approach utilizes the least mean squares. Of course, a number of other second order factors may be considered in the calculation of the appropriate $\alpha$-multipliers as well.

Figure 5:
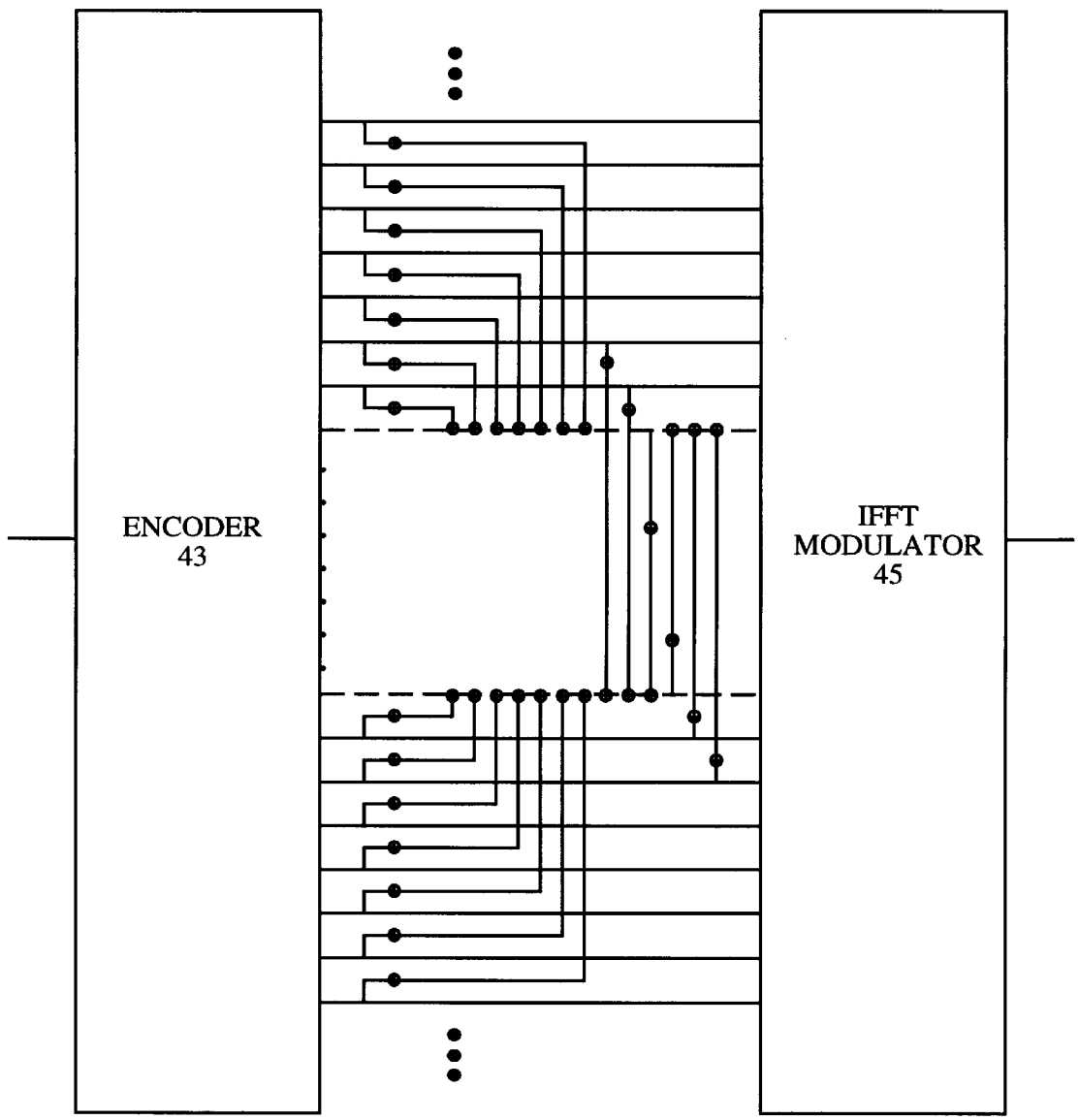
FIG. 5 is a diagrammatic block diagram illustrating the manner in which the dummy signals are created.

Referring next to FIG. 5, one embodiment which utilizes a pair of restricted frequency bands located on opposite sides of a restricted frequency band. Each dummy tone is composed of the 10 closest adjacent tones on each side of the restricted frequency band. Thus, the dummy tones are weighted sum of the various adjacent tones. The dummy tone is created as an input to the IFFT modulator 45.

When the restricted frequency band is relatively broad in relation to the width of the subchannels, it will generally be necessary to provide a pair of dummy tones for the restricted frequency range with one dummy tone being provided on each side of the restricted frequency range. However, when the restricted frequency band is relatively narrow in relation to the bandwidth of the subchannels, (as for example only one or two subchannels wide as in the case of the 10.1 to 10.15 MHz frequency range when 43.125 kHz wide subchannels are used), it may be possible and desirable to use only a single dummy tone in connection with the entire restricted frequency band. On the other hand, in applications where the restricted frequency band is quite wide and the amount of suppression required is very high (as for example if a 40 dBm/Hz suppression was required in the above example), it may be helpful and/or necessary to provide a pair of dummy tones on each side of the restricted frequency band. Although the calculations of the $\alpha$-multipliers would be more complex, it should be appreciated that better suppression could be obtained. Of course in other applications, additional dummy tones could be used as well.

It should be appreciated that the magnitude and phase of the various active tones will vary from symbol to symbol. Thus, the magnitude and phase of a particular dummy tone will not be fixed over time. Rather, it must be calculated for each symbol. However, the values of the $\alpha$-multipliers may be maintained as constants. With this arrangement, the transmitter only needs to calculate the magnitude and phase of the dummy tone(s) using a simple summing circuit or the like before transmitting each symbol. The calculation of the constants is done in conjunction with the design of the system and thus the complexity of the multiplier calculations is not a concern when constant multipliers are used.

The described use of dummy tones adjacent or nearly adjacent a restricted frequency band in cooperation with simply turning off the tones that overlap the restricted frequency band has been found to work well to control the emission of RF interference in the restricted RF frequency bands that fall within the 1–12 MHz frequency band. In twisted pair subscriber line applications, it is believed that unshielded drops would be the most likely sources of RF interference emissions. Since the remote units 18 will typically be wired to the drop, it is particularly important that upstream communications sent from the remote units towards the central office 10 address RF interference emission problem.

Figure 6:
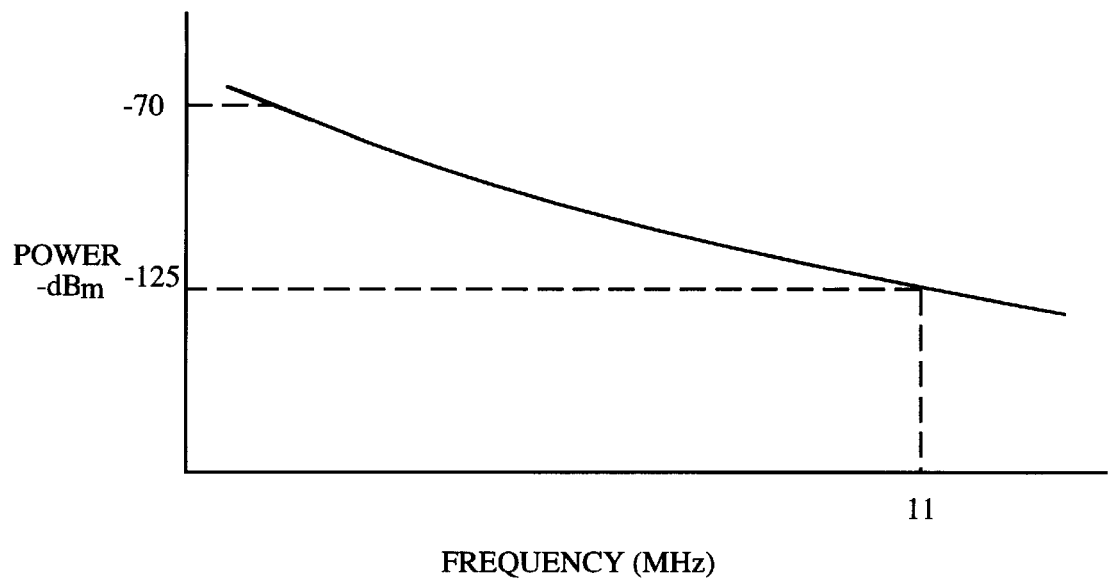
FIG. 6 is a graph illustrating the magnitude of the maximum in-tone received power at a remote unit as a function of transmission frequency in a typical VDSL application over twisted pair transmission lines.
Figure 7:
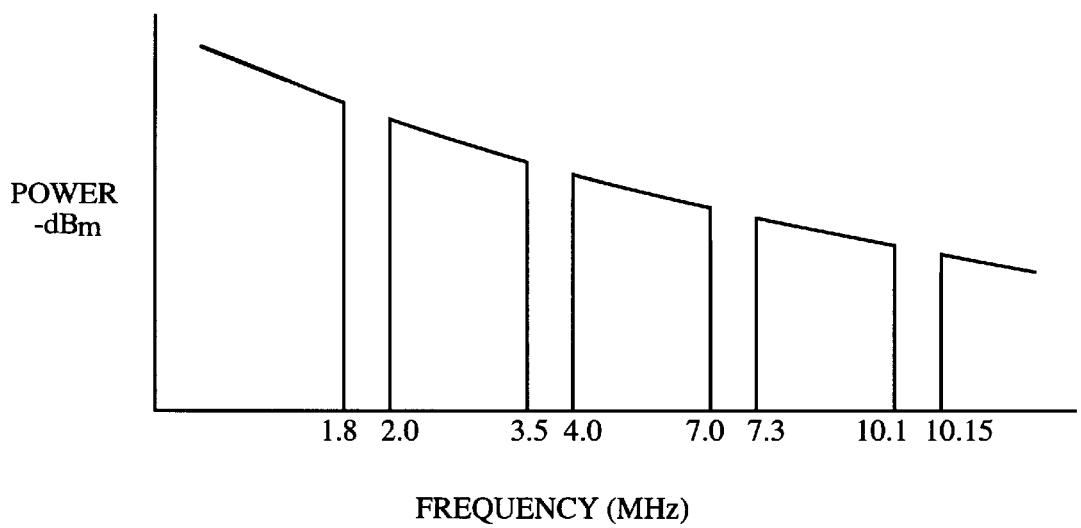
FIG. 7 is a graph illustrating the magnitude of the maximum in-tone received power at a remote unit as illustrated in FIG. 6 further taking into consideration the effects turning off the tones in the restricted frequency bands.

As will be appreciated by those skilled in the art, high frequency multi-carrier signals transmitted over twisted pair transmission lines experience significant attenuation when they are transmitted a relatively long distance over the twisted pair lines. By way of example, referring to FIG. 6, when the transmit power is on the order of −60 dBm/Hz throughout the transmission bandwidth of a DMT based VDSL modulation scheme, the receive power at a typical remote user may be on the order of −70 dBm/Hz at the lower end of the frequency spectrum, but may drop to as low as −125 dBm/Hz at the higher end of the frequency spectrum. Thus, in situations where the drop is located relatively far from the source, the downstream signals may be attenuated enough by the time they reach the drop that they are already below the permissible power spectral density within the restricted frequency ranges 34. Thus, in applications where the connections between the ONU and the twisted pair line are well shielded and the twisted pair lines are well shielded for a significant distance from the ONU, it may be possible to eliminate or reduce the use of dummy tones in the downstream signals.

In the primary embodiment described, the tones within the restricted frequency range are simply turned off and thus no data is transmitted over those tones. However, as best illustrated in FIG. 2, transmissions are not prohibited in the restricted frequency bands, rather the power spectral density within those bands must be reduced below a designated threshold. Thus, in some applications it may be possible to transmit data over tones within one or more of the restricted frequency bands by just reducing the power of the tones within the restricted frequency range. The use of dummy tones to suppress sidelobe noise from tones outside of the restricted frequency range may still prove useful in such applications. In the described embodiments, the dummy tones have been located outside of the restricted frequency band. However, in some limited circumstances, the use of a dummy tone that actually falls within the restricted frequency band may prove useful in reducing the net power of emissions within the band.

As pointed out above, an equally important problem in the implementation of a wide band multi-carrier modulation scheme relates to the handling of RF interference that is introduced to the twisted pair transmission line and is received by a modem. Ingressed amateur radio interference tends to take the form of very narrow band interference that is less than approximately 4 kHz wide. However, the location of the interference may fall anywhere within the restricted frequency band and may periodically hop from one band to another. Also it is possible that the interference will simultaneously be received from two or more specific transmitters which are each transmitting on separate frequency bands. When the antennas are located relatively close to a drop or other unshielded portions of the transmission line, the strength of the received RF interference can dwarf the strength of the tones in the affected frequency band. The VDSL design specification contemplates the introduction of very high intensity narrow band RF noise within the restricted frequency bands. Thus, it is contemplated that several mechanism will be provided to reduce the effects of the RF interference.

Figure 12:
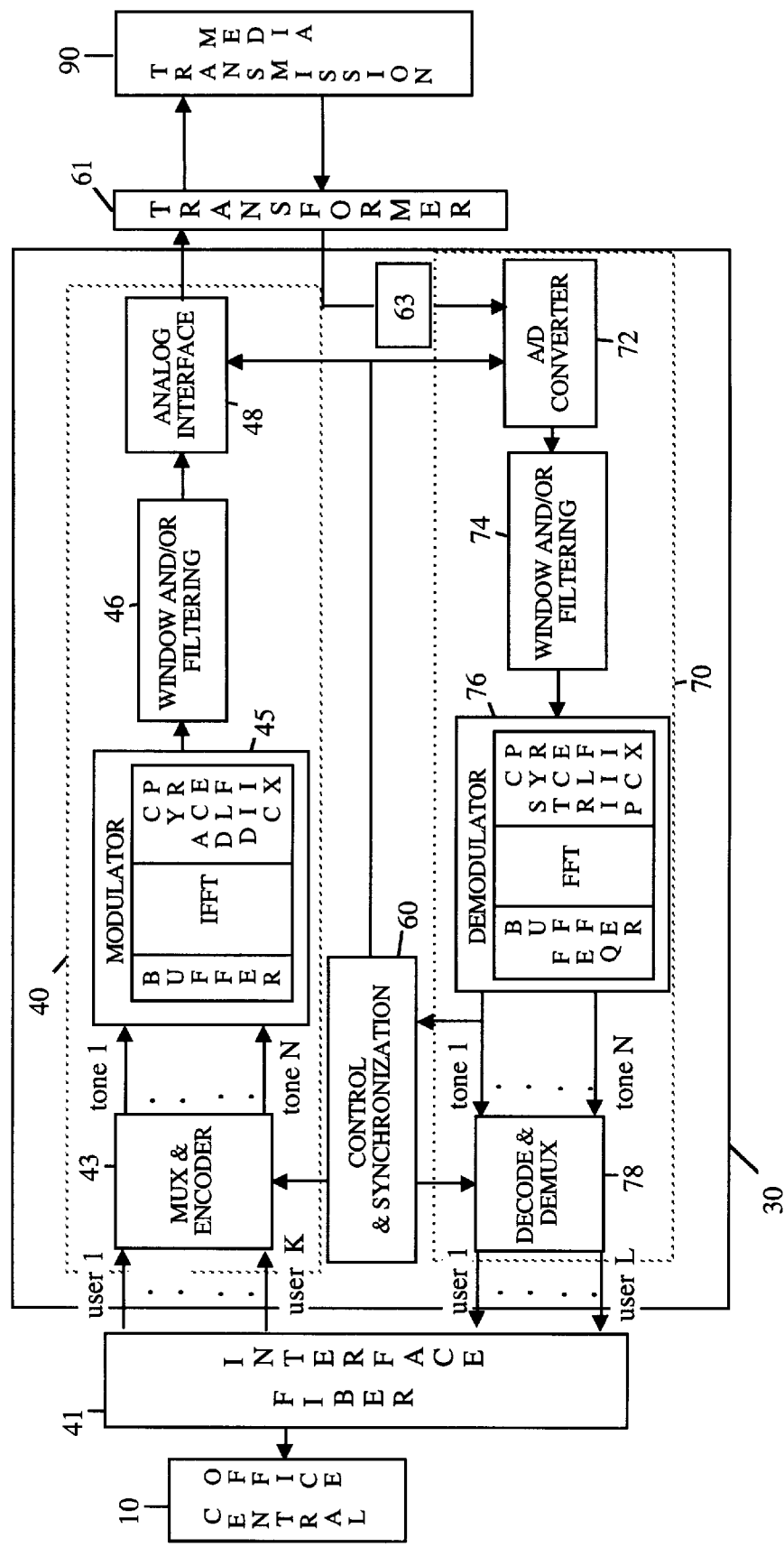
FIG. 12 is a diagrammatic block diagram of a central modem suitable for implementing a discrete multi-tone transmission scheme in accordance with one embodiment of the present invention.

Initially, as seen in FIG. 12, a transformer 61 is provided before the A/D converter to reduce the common mode noise. Since the transmission line is a twisted pair line, the vast majority of the RF interference will take the form of common mode noise that can be rejected by the transformer 61. By way of example, the transformer may be capable of reducing the received RF noise by about 30. However, the differential mode signal passed by the transformer would still have a very significant amount of noise that must be rejected to permit detection of the DMF signals. By way of example, differential mode noise intensities as high as −10 dBm/Hz are contemplated by the VDSL specification. The output of the transformer 61 is either directly input to the A/D converter or indirectly input to the A/D converter through other noise reducing mechanisms such as a differential mode canceling unit. The differential mode canceling unit is a filter arranged to reject a portion of the differential mode signal output from the transformer that can be attributed to an imbalance between the RF noise received on the two wires that constitute the twisted pair. By way of example, a suitable differential mode canceling unit is described in provisional application Ser. No. 60/016,251 filed Apr. 19, 1996, by Cioffi et al. and entitled: Radio Frequency Noise Canceler. That application is incorporated herein by reference.

Regardless of the filtering that occurs prior to the A/D converter, the signal received by the A/D converter 62 will still include a significant RF noise component which must be handled by the receiver. As described above, the tones within the restricted frequency bands have already been turned off in order to prevent the emission of RF interference. Therefore, there is no data on any of the subchannels within the restricted frequency bands. Thus, one approach to reducing the narrow band RF noise component within the receiver is to provide notch filters within the restricted frequency bands. The notch filters may be either adaptive filters or static filters and may operate on either the analog or digital signals. Adaptive filters have the advantage of performing better noise suppression since the adaptive filter can be tuned to the frequency of the incoming RF interference. However, as will be appreciated by those skilled in the art, it is relatively difficult to determine the frequency of an unknown RF signal on the fly and therefore a relatively large amount of digital signal processing is required to implement the filter which has potential drawbacks in terms of both costs and responsiveness of the system. Additionally, when the narrow band RF interference is located relatively close to the edge of a restricted frequency band it may provide a relatively greater amount of distortion to the adjacent tones since it will chop the sidelobes that overlap the notch.

In contrast, static filters have the advantage of lower costs, but since they are not tuned to the frequency of the RF interference, they must be tuned to a particular frequency within the restricted frequency band (as for example the center of the restricted frequency band). By way of example, a static notch filter for a particular restricted frequency band may be centered in the middle of the restricted frequency band. While static filters do a good job of filtering noise at the frequency that they are tuned to, their performance falls off considerably as the frequency of the RF interference separates from the tuned frequency of the filter. Thus, a separate aspect of the present invention provides yet another mechanism for further reducing the RF interference. This mechanism is essentially the converse of the dummy tone usage described above with respect to RF interference egress.

More specifically, if no tone is transmitted on the subchannel located adjacent a restricted frequency range, (i.e. subcarrier (n−1) is a "quiet" tone), the expected intensity of the signal at the frequency of tone $T_{n-1}$ due to the sidelobes of the adjacent frequency tones would be zero due to the nature of the multi-carrier transmissions. This is best illustrated in FIG. 2. Thus, any signal intensity that is detected on quiet tone $T_{n-1}$ would presumably be due to the effects of the RF interference ($RFIT_{n-1}$),. Once the effect of the radio frequency interference has been determined for the quiet tone, an attempt can be made to estimate the expected interference for the adjacent active tones. It should be appreciated that the calculation of the expected interference for the adjacent active tones will be an imprecise science when that actual frequency of the RF Interference is unknown. However, by making some simple assumptions, a set of λ-multipliers analogous to the α-multipliers can be calculated which will provide a relatively good estimate of the expected interference for the adjacent tones.

The worst case for interference would be a situation where the RF interference is located at a point midway between an edge tone within the restricted frequency and an adjacent tone. Assuming the worst case offset (i.e. that the RF noise is located midway between the first and second tones within the restricted frequency range), the numbers set forth above for the magnitude and phase of the side lobes relative to the main tone, (i.e. $2/3\pi$, $+2/5\pi$, $-2/7\pi$, etc.) would apply to the RF interference as well. Thus, the use of a simple "worst case" approach to determining the λ-multipliers would result in the same values being used for the λ-multipliers as were calculated for the first set of α-multipliers. That is:

$\lambda_{-2} = -3/5 = -0.60$ $\lambda_{-3} = 3/7 = 0.43$ $\lambda_{-4} = -3/9 = -0.33$ $\lambda_{-5} = 3/11 = 0.27$ $\lambda_{-6} = -3/13 = -0.23$ $\lambda_{-7} = 3/15 = 0.20$ $\lambda_{-8} = -3/17 = -0.18$ $\lambda_{-9} = 3/19 = 0.16$ $\lambda_{-10} = -3/21 = -0.14$ $\lambda_{-11} = 3/23 = 0.13$, etc.

The λ-multipliers are factors which when multiplied by the RF interference for the measured quiet tone ($RFIT_{n-1}$), will provide an estimate of the RF interference that will be observed on the associated tone. It is noted that the RF sidelobe interference will begin to fall off relatively quickly as the frequency of the interference approaches a designated tone. Indeed if the RF interference is centered on a tone, the effect theoretically falls off to zero as can be appreciated by reference to FIGS. 3(a) and 3(b). Additionally, the closer the RF interference is to the center of the restricted frequency band, the better the notch filter will be at reducing the intensity of the interference. Further, when the RF interference is embodied in a tone further from the associated edge of the restricted frequency band, the separation between the RF interference and the affected active tones will increase which also acts to reduce the intensity of the interference. Thus, as it turns out, the use of the worst case scenario as a basis for calculating the λ-multipliers is often a relatively good approximation when the tones immediately adjacent a restricted frequency range are used as the quiet tones. However, as described above with respect to the calculation of the α-multipliers, the calculation of the λ-multipliers can be optimized to take into consideration a variety of other factors. Generally, the intent would be to statistically maximize the canceling of the RF noise at the active tones. Again, a least squares fit approach is appropriate for calculating the λ-multipliers.

In the embodiment described above, the measured quiet tones are situated on opposite sides of the restricted frequency band immediately adjacent the restricted frequency band. However, this is not a requirement. In alternative embodiments, one or both of the measured quiet tones may actually be a tone within the restricted frequency band. The most appropriate tone within the restricted frequency band would be the tones at the respective edges of the restricted frequency band. In one alternative embodiment, a detector is used to estimate whether the incoming RF noise is within the lower or upper end of the restricted frequency band. The tone immediately adjacent the side of the restricted frequency band that the RF interference is located on is used as the first measured quiet tone while the edge tone within the restricted frequency band is used as the second measured quiet tone.

Figure 8:
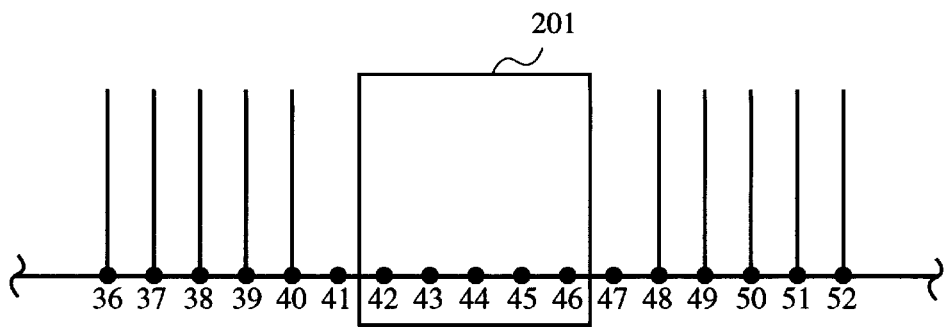
FIG. 8 is a diagrammatic representation of the signal tones in the vicinity of the 1.8 to 2.0 MHz restricted frequency band in accordance with one configuration of the present invention.

In an application which only requires the control of ingress, only the measured quiet tones need to be provided. One embodiment that utilizes a pair of measured quiet tones on opposite sides of a restricted frequency band is illustrated in FIG. 8. In this embodiment, the restricted frequency band 201 is 1.8 to 2.0 MHz and overlaps tones 42–46 in a DMT system having 43.125 kHz wide subchannels. The measured quiet include tones 41 and 47. In the embodiment shown, two overhead subchannels are required (e.g. tones 41 and 47). As pointed out above, instead of measuring quiet tones 41 and 47, it may be possible to measure one or both of tones 42 and 46 (which are within the restricted frequency band) in place of tones 41 and 47. If satisfactory performance can be obtained by measuring one or both of the measured quiet tones within the restricted frequency band, such an arrangement would generally be preferred since it reduces the overhead associated with avoiding the restricted frequency band which would improve performance.

Figure 9:
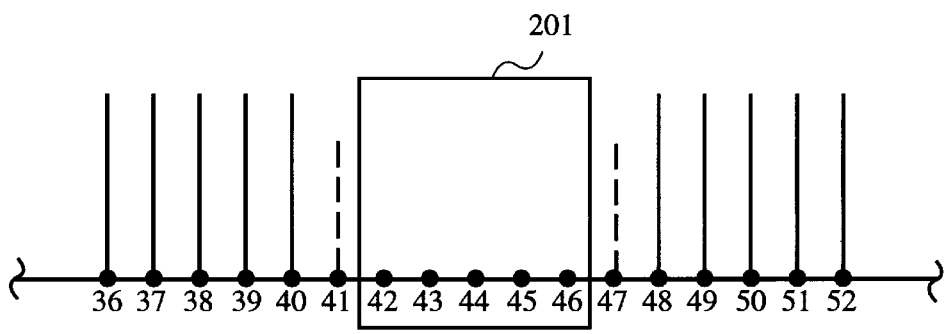
FIG. 9 is a diagrammatic representation of the signal tones in the vicinity of the 1.8 to 2.0 MHz restricted frequency band in accordance with a second configuration of the present invention.

In contrast, in an application which only requires the control of egress, only the dummy tones need to be provided. One embodiment analogous to FIG. 8 that utilizes a pair of dummy tones on opposite sides of a restricted frequency band is illustrated in FIG. 9. Thus, the dummy tones are encapsulated in subchannels 41 and 47. As pointed out above, in some embodiments which have very narrow restricted frequency bands, it may be possible to utilize a single dummy tone to obtain the desired performance.

Figure 10:
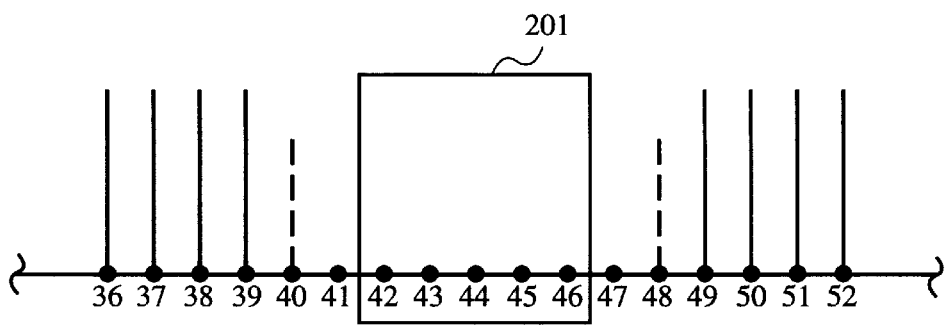
FIG. 10 is a diagrammatic representation of the signal tones in the vicinity of the 1.8 to 2.0 MHz restricted frequency band in accordance with a third configuration of the present invention.

In other embodiments it may be necessary to control both ingress and egress which can be accomplished by utilizing a combination of dummy tones and measured quiet tones. By way of example, one embodiment analogous to FIGS. 8 & 9 that utilizes both dummy tones and measured quiet tones is illustrated in FIG. 10. In this embodiment, tone 40 is the lower dummy tone, tone 41 is the lower quiet tone, tone 47 is the upper quiet tone and tone 48 is the upper dummy tone. It is noted that the dummy tones are preferably situated outside of the measured quiet tones. Positioning the measured quiet tones between the restricted frequency band and the dummy tones serves to provide a buffer around the restricted frequency band which helps suppress the effects that the sidelobes have within the restricted frequency range. Additionally, if the measured quiet tones 41 and 47 are considered when calculating the value of the α-multipliers, the values can be optimized to further reduce power within the restricted frequency band (tones 42–46) since the magnitude and phase of the total power in tones 41 and 47 is not restricted.

Figure 11:
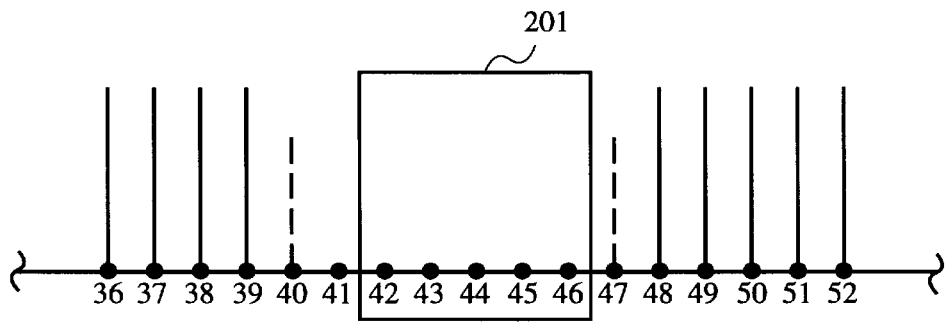
FIG. 11 is a diagrammatic representation of the signal tones in the vicinity of the 1.8 to 2.0 MHz restricted frequency band in accordance with a fourth configuration of the present invention.

In another embodiment represented by FIG. 11, a pair of dummy tones are provided in subchannels 40 and 47 while the measured quiet tones are provided in subchannels 41 and 46. That is, one of the measured quiet tones is within the restricted frequency band. Alternatively, the dummy tones could be provided on subchannels 41 and 48 with tone 47 being utilized as a measured quiet tone. When satisfactory performance can be obtained with this arrangement, it is preferable when compared to the embodiment of FIG. 10 since it requires the use of just three overhead subchannels as opposed to the four overhead subchannels required by the embodiment of FIG. 10.

In still another level of optimization that may be useful in some embodiments, the dummy tones are provided immediately adjacent the restricted frequency band as illustrated in FIG. 9, and the outermost tones within the restricted frequency band are used as the measured quiet tones. In still further embodiments additional dummy tones and/or additional quiet tones may be provided in order to achieve the required performance. In such embodiments the dummy tones would generally be positioned outside of any quiet tones, although this is not strictly a requirement.

Referring next to FIG. 12, a central modem architecture suitable for implementing the described discrete multi-tone transmission scheme will be described. In embodiments which couple one or more fiber optic trunk lines to a plurality of twisted pair end user lines, the central modem 30 would typically take the form of an ONU. The central modem includes a fiber interface 41, a transmitter 40, a receiver 70, and a controller 60. The controller 60 is used to synchronize the clocks of the remote modems with the clock in the central modem, as well as synchronize frames transmitted from the remote modems. A central office 10 provides digital data to the transmitter 40 through an asynchronous transfer modem switch 41 (labeled fiber interface in the drawings). The central office 10 can provide data at any data rate up to the maximum data rate permitted in view of the transmitter's capability, the transmission distance, the transmission line quality and the type of communications line used. The transmitter 40 incorporates several components including an encoder 43, a discrete multi-tone modulator 45 and a windowing filter 46. The encoder 43 serves to multiplex, synchronize and encode the data to be transferred (such as video data). More specifically, it translates incoming bit streams into in phase and quadrature components for each of a multiplicity of subchannels. The encoding may be done using forward error correction and/or trellis coding. The encoder would typically be arranged to output a number of subsymbol sequences that are equal to the number of subchannels available to the system. By way of example, in a system having 256 subchannels, the encoder would output 256 subsymbol sequences minus the number of subchannels in the restricted frequency band(s). These inputs are complex inputs that are passed to a discrete multi-tone modulator 45. By way of example, a suitable encoder is described in detail in the referenced ANSI standard document.

The modulator 45 is an IFFT modulator that computes the inverse Fourier transform by any suitable algorithm. A suitable IFFT encoder is described in J. Bingham's article entitled: "Multi-carrier Modulation: An Idea Whose Time Has Come," IEEE Communication Magazine, May 1990. Since the encoder outputs are complex numbers, the IFFT modulator receives twice as many inputs as there are subchannels available. The bit distribution is determined adaptively in discrete multi-tone systems. To facilitate this, the transmitter 40 also includes a line monitor that monitors the communication line to determine the line quality of each of the available subchannels. In one embodiment, the line monitor (which may be part of the controller 60) determines the noise level, gain and phase shift on each of the subchannels. The object is to estimate the signal-to-noise ratio for each of the subchannels. Therefore, other parameters could be monitored as well or in place of the parameters described. The determination of which subchannels to transmit the encoded data over as well as how much data to transmit over each subchannel is dynamically determined on the basis of several factors. The factors include the detected line quality parameters, subchannel gain parameters, a permissible power mask, and the desired maximum subcarrier bit-error rates. It is noted that the various factors need not be constant between subchannels and indeed may even vary during use. Most notably, the line quality parameters may be repeatedly checked, and adjustments in the modulation scheme are made in real time to dynamically adjust the modulation as the line quality over various subchannels changes during use. By way of example, a suitable discrete multi-tone modulator is generically described in the same ATIS standard document.

After the encoded signal has been modulated to form a discrete multi-tone signal, a cyclic prefix is appended to the discrete multi-tone encoded signal. The cyclic prefix is used primarily to simplify the demodulation of the discrete multi-tone signals and is not strictly required. The length of the cyclic prefix may be widely varied. By way of example, in a 512 sample signal, a 40-bit cyclic prefix may be used.

The modulated signal is then passed through a windowing filter 46 and/or other filters in order to minimize the out of band energy. This is desirable to help prevent the analog interfaces in the remote receivers from saturating. The windowing can be accomplished by a wide variety of conventional windowing protocols. The transmitter also includes an analog interface 48 which applies the discrete multi-tone signal to the transmission media. In hardwired systems such as twisted pair phone lines and coaxial cables, the analog interface may take the form of a line driver.

The central modem 30 also includes a receiver 70 for receiving multi-tone signals from the remote units. The receiver 70 includes an analog interface 72, a windowing filter 74, a demodulator 76, and a decoder 78. Signals received by the central modem 30 are initially received through the analog filter 72. The windowing filter 74 is arranged to effectively perform windowing and/or filtering functions on the received signal. One suitable filter arrangement is a time domain equalizer 74. Again, the windowing can be accomplished by a wide variety of conventional windowing protocols. The demodulator 76 demodulates the equalized discrete multi-tone signal and strips the cyclic prefix. The decoder 78 decodes the demodulated signal. The demodulator 76 and the decoder 78 effectively perform inverse functions of the modulator 45 and encoder 43, respectively. The decoded signal is then passed from the decoder 78 to the central office 10 or other appropriate user of the information through the interface 41. The functions of the time domain equalizer 74, the demodulator 76 and the decoder 78, as well as algorithms suitable for accomplishing the desired functions are all described in more detail in Chow et al.'s U.S. Pat. No. 5,285,474.

Figure 13:
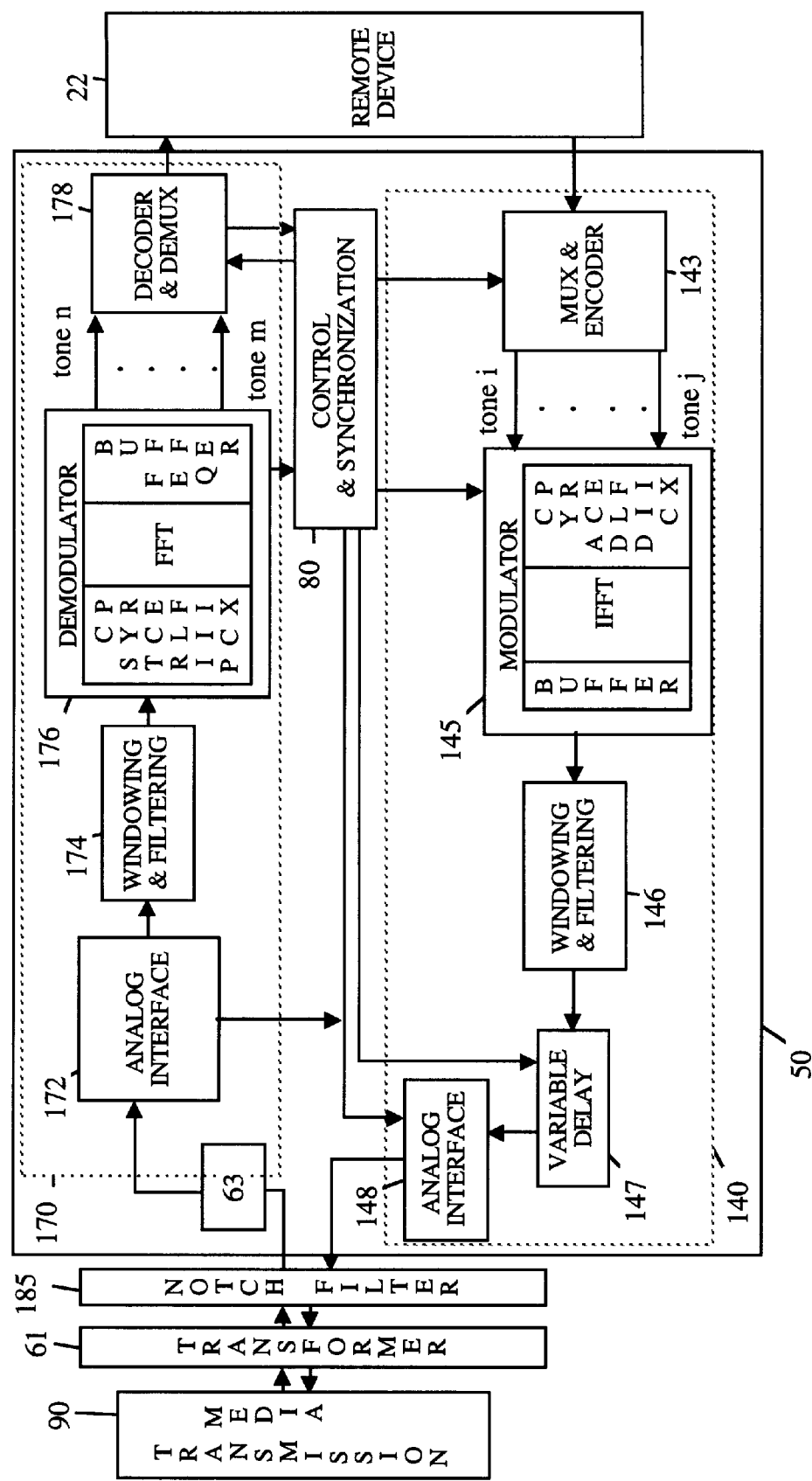
FIG. 13 is a diagrammatic block diagram of a remote modem suitable for implementing a discrete multi-tone transmission scheme in accordance with one embodiment of the present invention.

Referring next to FIG. 13, a remote unit architecture suitable for implementing the synchronization of the present invention will be described. In many respects the remote modem will be similar to the central modem although its respective upstream and downstream communications capacities may be somewhat different. A signal transmitted by the central modem 30 is received by a remote unit 50 through the transformer 61, notch filter 185 and canceler 63. The remote unit 50 includes the analog interface 172, a time domain equalizer (TEQ) 174, a demodulator 176 that demodulates the equalized discrete multi-tone signal and strips the cyclic prefix, and a decoder 178 that decodes the demodulated signal. The time domain equalizer 174 effectively performs a filtering functions on the received signal. A windowing filter may also be employed. The demodulator 176 and the decoder 178 perform inverse functions of the modulator 45 and encoder 43, respectively. The decoded signal is then passed from the decoder 178 to a remote device 22 such as a video telephone, a television, a computer, or other suitable receiving apparatus. The functions of the time domain equalizer 174, the demodulator 176 and the decoder 178, are similar to the functions of the corresponding components in the central modem. An analog notch filter 185 may be provided at a location upstream of the receiver's analog filter 172 in order to block energy within the restricted frequency bands to help guard against the ingress of unwanted RF signals. A transformer 61 may be provided to reject common mode noise and/or canceling unit 63 may be provided to reject differential mode noise attributed to twisted pair line imbalance. This can help prevent the analog filter from saturating. By providing a notch or other suitable filtering mechanism for filtering out of band and restricted band energy, lower cost receiver components can be used since it is not necessary for the receiver itself to handle as much energy.

Although the present invention has been described in detail only as it applies to a few specific modulation schemes, it should be understood that the present invention may be embodied in many other specific forms without departing from the spirit or scope of the invention. For instance, although the specification has described its use in VDSL/FTTC and other subscriber line based very high speed data transmission systems, it may be used in other systems which experience significant narrow band interference or have restricted frequency bands within their designated transmission bands. In the primary described embodiment, the invention's application to a system which utilizes a Discrete Multi-tone modulation scheme has been described. However, it can readily be used in systems which use other modulation techniques as well. By way of example, the use of dummy tones can help suppress narrow band transmissions in other multi-carrier transmission schemes using modulation techniques such as Discrete Wavelet Multi-tone Modulation (DWMT).

Further, it should be appreciated that the invention can be implemented using a wide variety of modem constructions at both the central and remote station locations. Therefore, the present examples are to be considered as illustrative and not restrictive, and the invention is not to be limited to the details given herein, but may be modified within the scope of the appended claims.

What is claimed is:

1. In a data transmission system that facilitates communications between a pair of modems using a multi-carrier transmission scheme that has a multiplicity of discrete subchannels within a designated transmission bandwidth, a method of transmitting multi-carrier signals in a manner that reduces the power spectral density of radio frequency emissions in a designated restricted frequency band within the designated transmission bandwidth, the method comprising the steps of:

(a) transmitting data signals over a plurality of selected data subchannels within the designated transmission bandwidth; and (b) transmitting a dummy tone over a selected dummy subchannel, wherein the magnitude and phase of the dummy tone is chosen to suppress the transmission power in the restricted frequency band due to sidelobe transmissions from at least one of the data subchannels outside of the restricted frequency band.

2. A method as recited in claim 1 wherein a plurality of dummy tones are transmitted over distinct dummy subchannels, wherein a first one of the dummy subchannels has a frequency higher than the restricted frequency band, and a second one of the dummy subchannels has a frequency lower than the restricted frequency band.

3. A method as recited in claim 1 wherein the dummy subchannel is a subchannel located immediately adjacent the restricted frequency band and no transmissions are made on any subchannels within the restricted frequency band.

4. A method as recited in claim 1 wherein a plurality of dummy tones are transmitted over distinct dummy subchannels, wherein two of the dummy subchannels are located on opposite sides of the restricted frequency band.

5. A method as recited in claim 1 wherein no signal is transmitted over a quiet subchannel that is immediately adjacent the restricted frequency band and the dummy subchannel is immediately adjacent the quiet subchannel.

6. A method as recited in claim 1 wherein the designated transmission bandwidth includes a plurality of restricted frequency bands and at least one dummy subchannel is associated with each restricted frequency band, each dummy subchannel having an associated dummy tone transmitted thereover.

7. A method as recited in claim 6 wherein a first one of the restricted frequency bands is in the range of approximately 1.8 to 2.0 MHz, a second one of the restricted frequency bands is in the range of approximately 3.5 to 4.0 MHz, and a third one of the restricted frequency bands is in the range of approximately 7.0 to 7.3 MHz.

8. A method as recited in claim 1 wherein the selected data subchannels do not include any subchannels within the designated frequency band and no data transmissions are made on any of the subchannels within the restricted frequency band.

9. A method as recited in claim 1 wherein data transmissions are made on at least one of the subchannels within the restricted frequency band.

10. In a data transmission system that facilitates communications between a pair of modems using a multi-carrier transmission scheme that has a multiplicity of discrete subchannels within a designated transmission bandwidth, a method of suppressing radio frequency noise that is likely to occur in a designated frequency band within the designated transmission bandwidth, the method comprising the steps of:

(a) receiving data signals over a plurality of selected data subchannels within the designated transmission bandwidth;

(b) detecting noise received on a selected dummy subchannel, wherein it is assumed that no data has been transmitted over the dummy subchannel; and (c) canceling RF interference imposed on the data signals received over a first plurality of the selected data subchannels based at least in part on the detected magnitude and phase of the signal received on the selected dummy subchannel.

11. A method as recited in claim 10 wherein the selected dummy subchannel is a first subchannel located at a first end of the designated frequency band, the method further comprising the steps of:

detecting noise received on a second selected dummy subchannel located on a second end of the designated frequency band, wherein it is assumed that no data has been transmitted over the second dummy subchannel; and canceling RF interference imposed on the data signals received over a second plurality of the selected data subchannels based at least in part on the detected magnitude and phase of the signal received on the second selected dummy subchannel.

12. A method as recited in claim 10 wherein the dummy subchannel is a subchannel located immediately adjacent the restricted frequency band and it is assumed that no transmissions were made on the dummy subchannel or any subchannels within the designated frequency band.

13. A method as recited in claim 10 wherein the dummy subchannel is a subchannel located within the designated frequency band at an edge of the designated frequency band.

14. A method as recited in claim 10 wherein there are a plurality of restricted frequency bands within the designated transmission bandwidth, including the designated frequency band and wherein a first one of the restricted frequency bands is in the range of approximately 1.8 to 2.0 MHz, a second one of the restricted frequency bands is in the range of approximately 3.5 to 4.0 MHz, and a third one of the restricted frequency bands is in the range of approximately 7.0 to 7.3 MHz, each of the restricted frequency bands having an associated dummy subchannel for which the detecting and filtering steps are performed.

15. A method as recited in claim 10 wherein the selected data subchannels do not include any subchannels within the designated frequency band and not data transmissions are made on any of the subchannels within the designated frequency band.

16. A method as recited in claim 10 wherein data transmissions are made on at least one of the subchannels within the designated frequency band.

17. A method as recited in claim 10 further comprising the step of passing the received data signals through a notch filter that is tuned to a frequency within the restricted frequency band.

18. A method as recited in claim 11 wherein at least some of the selected data subchannels fall within both the first and second pluralities of the selected data subchannels.

19. In a data transmission system that facilitates communications between a pair of modems using a multi-carrier transmission scheme that has a multiplicity of discrete subchannels within a designated transmission bandwidth, a method suppressing radio frequency interference in a designated restricted frequency band within the designated transmission bandwidth, the method comprising the steps of:

(a) transmitting data signals over a plurality of selected data subchannels within the designated transmission bandwidth, wherein the selected data subchannels do not include any subchannels within the restricted frequency band and no transmissions are made on any subchannels within the restricted frequency band and no transmissions are made on a dedicated quiet subchannel;

(b) transmitting a dummy tone over a selected dummy subchannel, wherein the magnitude and phase of the dummy tone is chosen to suppress the transmission power in the restricted frequency band due to sidelobe transmissions from at least one of the data subchannels (c) receiving the transmitted signals and passing the received signals through a notch filter that is tuned to a frequency within the restricted frequency band;

(d) detecting the magnitude and phase of the signal received on a the dedicated quiet subchannel, wherein it is assumed that no data has been transmitted over the dedicated quiet subchannel; and (e) canceling RF interference imposed on data signals received over a first plurality of the selected data subchannels based at least in part on the detected magnitude and phase of the signal received on the dedicated quiet subchannel.

20. A multi-carrier transmitter comprising:

an encoder for encoding digital information;

a modulator for modulating the encoded digital information onto a multiplicity of subcarriers to form a multi-carrier signal having a transmission bandwidth, each subcarrier corresponding to an associated tone and an associated subchannel, wherein the modulator is arranged to transmit data signals over a selected plurality of the data subchannels and to transmit a dummy tone over a selected dummy subchannel, wherein the magnitude and phase of the dummy tone is chosen to suppress the transmission power in a restricted frequency band portion of the transmission bandwidth due to sidelobe transmissions from at least one of the data subchannels outside of the restricted frequency band.

21. A transmitter as recited in claim 20 wherein the modulator is arranged to transmit a plurality of dummy tones over distinct dummy subchannels.

22. A transmitter as recited in claim 20 wherein a first one of the dummy subchannels has a frequency higher than the restricted frequency band, and a second one of the dummy subchannels has a frequency lower than the restricted frequency band.

23. A transmitter as recited in claim 21 wherein the transmission bandwidth includes a plurality of restricted frequency bands and at least one dummy subchannel is associated with each restricted frequency band, each dummy subchannel having an associated dummy tone transmitted thereover.

* * * * *